(12) United States Patent
Christensson et al.

(10) Patent No.: US 6,510,224 B1
(45) Date of Patent: Jan. 21, 2003

(54) ENHANCEMENT OF NEAR-END VOICE SIGNALS IN AN ECHO SUPPRESSION SYSTEM

(75) Inventors: Nils Christensson, Malmö (SE); John Philipsson, Lund (SE)

(73) Assignee: Telefonaktiebolaget L M Ericsson, Stockholm (SE)

( * ) Notice: Subject to any disclaimer, the term of this patent is extended or adjusted under 35 U.S.C. 154(b) by 0 days.

(21) Appl. No.: 09/315,009

(22) Filed: May 20, 1999

(51) Int. Cl.[7] .................................................. H04N 9/08
(52) U.S. Cl. ........................... 379/406.03; 379/406.01; 379/406.02; 379/406.08; 379/406.09; 379/406.1; 379/406.06
(58) Field of Search ....................... 379/406.01–406.16; 704/200–278; 381/71.1–71.14

(56) References Cited

U.S. PATENT DOCUMENTS

| | | |
|---|---|---|
| 3,826,878 A | 7/1974 | Bendel |
| 5,136,577 A | 8/1992 | Amano et al. |
| 5,305,307 A | 4/1994 | Chu |
| 5,408,530 A | 4/1995 | Makino et al. |
| 5,500,880 A | 3/1996 | Kellermann |
| 5,548,642 A | 8/1996 | Diethorn |
| 5,553,014 A | 9/1996 | De León, II et al. |
| 5,633,936 A | * 5/1997 | Oh |
| 5,706,344 A | * 1/1998 | Finn |
| 6,061,444 A | * 5/2000 | Kawahara et al. |
| 6,108,413 A | * 8/2000 | Capman et al. |

FOREIGN PATENT DOCUMENTS

| | | |
|---|---|---|
| EP | 0721274 A2 | 7/1996 |
| EP | 0789476 A2 | 8/1997 |
| EP | 0821513 A1 | 1/1998 |
| EP | 0854626 A1 | 7/1998 |
| FR | 2678453 | 12/1992 |
| GB | 2240452 A | 7/1991 |
| JP | 1-5250 | 1/1989 |
| JP | 63-294018 A | 11/1998 |
| WO | WO9621313 | 7/1996 |
| WO | WO9745995 | 12/1997 |

\* cited by examiner

Primary Examiner—Forester W. Isen
Assistant Examiner—Ramnandan Singh
(74) Attorney, Agent, or Firm—Burns, Doane, Swecker & Mathis, L.L.P.

(57) ABSTRACT

An enhanced near-end voice signal may be generated in a hands-free environment by receiving an audio signal, generating an estimated acoustic echo signal, and generating a processed signal by removing the estimated acoustic echo signal from the audio signal. A near-end enhanced spectrum is then determined, that has one or more ranges of contiguous frequencies over which the detector spectrum takes on its largest values, wherein the range of contiguous frequencies are those associated with a relatively high echo return loss in the processed signal. The processed signal is filtered in accordance with the near-end enhanced spectrum, thereby generating an enhanced near-end voice signal. The enhanced near-end voice signal may then be applied to any of a number of components that are intended to process near-end speech. For example, when applied to a voice activity detector, the amount of energy contained in the enhanced near-end voice signal is then measured. The presence or absence of near-end voice activity may then be determined based on the measured energy of the enhanced near-end voice signal. The process may be repeated periodically to effect dynamically adjustable operation.

14 Claims, 9 Drawing Sheets

ENHANCEMENT OF NEAR-END VOICE SIGNALS IN AN ECHO SUPPRESSION SYSTEM

BACKGROUND

The present invention relates to the processing of speech signals in a communications system, and more particularly to the enhancement of near-end speech in a signal that includes the near-end speech combined with an echo of far-end speech.

In the field of telecommunications, such as with speaker phones and in cellular telephony, it is often desirable to allow a user to operate communication equipment without requiring the continued occupation of one or more of the user's hands. This can be an important factor in environments, such as automobiles, where a driver's preoccupation with holding telephone equipment may jeopardize not only his or her safety, but also the safety of others who share the road. Freedom of use one's hands for something other than holding a microphone is useful in other applications as well, such as with internet communication by means of a personal computer, speech recognition by a computer, or with audio-visual presentation systems.

To accommodate these important needs, so-called "hands-free" equipment has been developed, in which microphones and loudspeakers are mounted within the hands-free environment, thereby obviating the need to hold them. For example, in an automobile application, a cellular telephone's microphone might be mounted on the sun visor, while the loudspeaker may be a dash-mounted unit, or may be one that is associated with the car's stereo equipment. With components mounted in this fashion, a cellular phone user may carry on a conversation without having to hold the cellular unit or its handset. Similarly, personal computers often have microphones and loudspeakers mounted, for example, in a monitor in relatively close proximity to each other.

One problem with a hands-free arrangement is that the microphone tends to pick up sound from the nearby loudspeaker, in addition to the voice of the user of the hands-free equipment (the so-called "near-end user"). This is also a problem in some non-hands-free devices, such as handheld mobile telephones, which are becoming smaller and smaller. (Because of the small size, a mobile telephone's microphone cannot entirely be shielded from the sound emitted by its loudspeaker). This sensing by the microphone of sound generated by the loudspeaker can cause problems in many types of applications. For example, in communications equipment, delays introduced by the communications system as a whole can cause the sound from the loudspeaker to be heard by the individual on the other end of the call (the so-called "far-end") as an echo of his or her own voice. Such an echo degrades audio quality and its mitigation is desirable. A similar problem can exist, for example, in automated systems that synthesize speech through a loudspeaker, and include voice recognition components for recognizing and responding to spoken commands or other words sensed by the microphone. In such applications, the presence of an echo of synthesized speech in the microphone signal can severely degrade the performance of the speech recognition components. Solutions for ameliorating such echoes include utilizing an adaptive echo cancellation filter or an echo attenuator.

Figure 1:
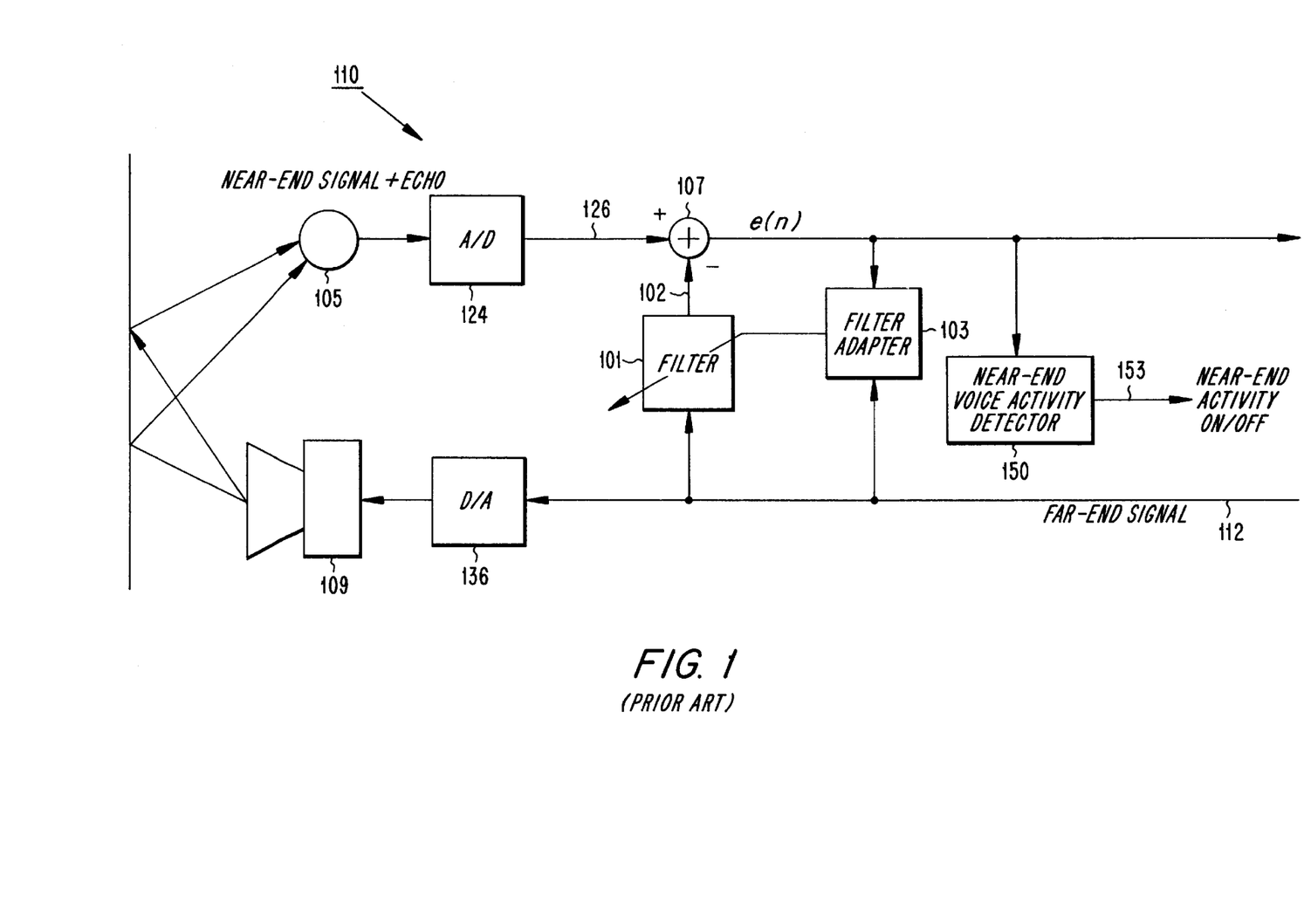
FIG. 1 is a block diagram of a conventional hands-free transceiver that includes an acoustic echo canceler and a near-end voice activity detector.

As a representative example of hands-free equipment in general, an exemplary "hands-free" mobile telephone, having a conventional echo canceler in the form of an adaptive filter arrangement, is depicted in FIG. 1. A hands-free communications environment may be, for example, an automotive interior in which the mobile telephone is installed. Such an environment can cause effects on an acoustic signal propagating therein, which effects are typically unknown. Henceforth, this type of environment will be referred to throughout this specification as an unknown system H(z). The microphone 105 is intended for detecting a user's voice, but may also have the undesired effect of detecting audio signals emanating from the loudspeaker 109. It is this undesired action that introduces the echo signal into the system.

Circuitry for reducing, if not eliminating, the echo includes an adaptive filter 101, such as an adaptive Finite Impulse Response (FIR) filter, an adaptation unit 103, such as a least mean square (LMS) cross correlator, and a subtractor 107. In operation, the adaptive filter 101 generates an echo estimate signal 102, which is commonly referred to as a û signal. The echo estimate signal 102 is the convolution of the far-end signal 112, and a sequence of m filter weighting coefficients ($h_i$) of the filter 101 (See Equation 1).

$$\hat{u}(n) = \sum_{i=0}^{m-1} h_i x(n-i) \tag{1}$$

where:
x(n) is the input signal,
m is the number of weighting coefficients, and
n is the sample number.

When the weighting coefficients are set correctly, the adaptive filter 101 produces an impulse response that is approximately equal to the response produced by the loudspeaker 109 within the unknown system H(z). The echo estimate signal 102 generated by the adaptive filter 101 is subtracted from the incoming digitized microphone signal 126 (designated u(n) in Eq. 2), to produce an error signal e(n) (see Eq. 2)

$$e(n) = u(n) - \hat{u}(n) \tag{2}$$

Ideally, any echo response from the unknown system H(z), introduced by the loudspeaker 109, is removed from the digitized microphone signal 126 by the subtraction of the echo estimate signal 102. Typically, the number of weighting coefficients (henceforth referred to as "coefficients") required for effectively canceling an echo will depend on the application. For handheld phones, fewer than one hundred coefficients may be adequate. For a hands-free telephone in an automobile, about 200 to 400 coefficients will be required. A large room may require a filter utilizing over 1000 coefficients in order to provide adequate echo cancellation.

It can be seen that the effectiveness of the echo canceler is directly related to how well the adaptive filter 101 is able to replicate the impulse response of the unknown system H(z). This, in turn, is directly related to the set of coefficients, $h_i$, maintained by the filter 101.

It is advantageous to provide a mechanism for dynamically altering the coefficients, $h_i$, to allow the adaptive filter 101 to adapt to changes in the unknown system H(z). In a car having a hands-free cellular arrangement, such changes may occur when a window or car door is opened or closed. A well-known coefficient adaptation scheme is the Least Mean Square (LMS) process, which was first introduced by Widrow and Hoff in 1960, and is frequently used because of its efficiency and robust behavior. As applied to the echo cancellation problem, the LMS process is a stochastic gradient step method which uses a rough (noisy) estimate of the gradient, g(n)=e(n)x̲(n), to make an incremental step toward minimizing the energy of an echo signal in a microphone signal, e(n), where x̲(n) is in vector notation corresponding to an expression x̲(n)=[x(n)x(n−1)x(n−2) . . . x(n−m+1)]. The update information produced by the LMS process e(n) x̲(n) is used to determine the value of a coefficient in a next sample. The expression for calculating a next coefficient value $h_1(n+1)$ is given by:

$$h_i(n+1) = h_i(n) + \mu e(n)x(n-i), i=0 \ldots m-1 \quad (3)$$

where
x(n) is the digitized input signal,
($h_i$) is a filter weighting coefficient,
i designates a particular coefficient,
m is the number of coefficients,
n is the sample number, and
$\mu$ is a step or update gain parameter.

The LMS method produce information in incremental portions each of which portions may have a positive or a negative value. The information produced by the LMS process can be provided to a filter to update the filter's coefficients.

Referring back to FIG. 1, the conventional echo cancellation circuit includes a filter adaptation unit 103 in the form of an LMS cross correlator for providing coefficient update information to the filter 101. In this arrangement, the filter adaptation unit 103 monitors the corrected signal e(n) that represents the digitized microphone signal 126 minus the echo estimate signal 102 generated by the filter 101. The echo estimate signal 102 is generated, as described above, with the use of update information provided to the adaptive filter 101 by the filter adaptation unit 103. The coefficients, $h_i$, of the adaptive filter 101 accumulate the update information as shown in Eq. 3.

Having reduced the presence of the acoustic echo from the microphone signal, the resulting signal is then supplied to additional components for further processing which is application-specific. For example, in addition to the acoustic echo cancellation circuitry, such as that described above, transceivers such as the one depicted in FIG. 1 typically also include a near-end voice activity detector 150, which outputs a signal 153 that is indicative of whether or not a near-end user is speaking. The most commonly used approach to performing near-end voice activity detection employs a time domain power calculation. Typically, a decision regarding the presence or absence of voice activity is mainly based on a comparison between a threshold energy level (corresponding to background noise) and a measure of the bandpass filtered signal energy. The purpose of the bandpass filtering is to eliminate signal energy associated with background noise.

A signal that is indicative of the presence or absence of near-end speech may be useful for any of a number of uses. For one thin, in cellular communications systems such as the Global System for Mobile communication (GSM), digitized speech signals are not sent through the network in their raw form, but are instead encoded in a manner that reduces the number of bits that actually need to be transmitted from one place to another. In GSM, the speech coder takes advantage of the fact that each participant in a normal conversation speaks on average for less than 40% of the time. By incorporating a voice activity detector as part of the speech coder functioning, GSM systems operate in a discontinuous transmission mode (DTX), in which the GSM transmitter is not active during silent periods (i.e., when the near-end voice activity detector 150 indicates that the near-end user is not speaking). This approach provides a longer subscriber battery life and reduces instantaneous radio interference. A comfort noise subsystem at the receiving end introduces a background acoustic noise to compensate for the annoying switched muting which occurs due to DTX. p Near-end voice activity detectors may also be employed to control an attenuation factor of an active acoustic echo canceler based on whether a speech signal includes a near-end speech component.

Furthermore, near-end voice activity detectors may also be used to control adaptation speed of the adaptive filter 101.

Voice activity detectors are not the only types of components that process a signal representative of near-end speech. Such a signal may be supplied, for example, to a speech recognizer module. Speech recognizer modules are well-known, and are useful in applications that permit users to control an apparatus or computer via voice control, and in applications that permit users to create electronic documents merely by dictating them.

Furthermore, a signal representative of near-end speech may also be fed back within the system for use in controlling the echo cancellation filter 101 itself, such as for controlling speed of adaptation.

Despite the presence of echo cancellation circuitry, such as that described above, the signals generated for further processing (e.g., for transmission to the far-end user in a communications system, or for near-end speech recognition or for controlling the operation of the echo cancellation filter 101) may very often still include echo components. This may occur, for example, because the adaptive filter has not yet converged to a fully adapted state, or even after such convergence whenever the unknown environment H(z) changes, thereby requiring the adaptation process to be repeated. The presence of strong echo signal components in the signal can cause degraded or even faulty operation of the down-stream processing components, since these echo signal components may be mistaken for near-end speech.

Conventional applications that process near-end speech signals, such as conventional voice activity detectors, speech recognition modules and the like, typically assume that no echo is present in the signal to be processed, and therefore do not have any ability to focus on the near-end speech to the exclusion of echo signal components, which may also be in the frequency range of human voice activity.

SUMMARY

It is therefore an object of the present invention to provide methods and apparatuses that generate a signal in which near-end speech components are enhanced relative to echo signal components.

The foregoing and other objects are achieved in methods and apparatuses for generating an enhanced near-end voice signal. In accordance with one aspect of the invention, generating an enhanced near-end voice signal includes receiving an audio signal; generating an estimated acoustic echo signal; and generating a processed signal by removing the estimated acoustic echo signal from the audio signal. These steps are useful in, for example, a hands-free telephone apparatus, wherein loudspeaker signals, conveying information from the far-end user, are picked up as an acoustic echo by the microphone of the hands-free telephone apparatus. Next, a near-end enhancement spectrum is determined, wherein the near-end enhancement spectrum has at least one range of contiguous frequencies over which the near-end enhancement spectrum has a magnitude greater than a predetermined threshold, wherein the range of contiguous frequencies are those associated with a relatively high echo return loss in the processed signal. The processed signal is then filtered in accordance with the near-end enhancement spectrum, thereby generating an enhanced near-end voice signal.

In another aspect of the invention, the amount of energy contained in the enhanced near-end voice signal is measured. The presence or absence of near-end voice activity is then detected based on the measured energy of the enhanced near-end voice signal.

In accordance with yet another aspect of the invention, the enhanced near-end voice signal may be applied to a near-end speech recognizer, thereby obtaining improved speech recognition performance.

In accordance with another aspect of the invention, the above-described process is repeated periodically, so that the detection of whether near-end voice activity exists is dynamically adjustable to accommodate changing conditions.

In yet another aspect of the invention, determining the near-end enhancement spectrum comprises determining the near-end enhancement spectrum as a function of a weighted spectrum, wherein the weighted spectrum is defined as:

$$W(f) = \alpha \frac{\Gamma}{\Gamma_{max}} + \beta \frac{E}{E_{max}} + \gamma \frac{S}{S_{max}}$$

where:

$\Gamma$ is a spectrum of an estimate of an acoustic echo derived from a far-end signal;

E is an Echo Return Loss Enhancement spectrum that represents an echo canceling performance of step c);

N is a spectrum of the processed signal;

S is an echo spread spectrum that represents spectral spreading properties of the echo path;

$\Gamma_{max} = \max(\Gamma)$, $E_{max} = \max(E)$ and $S_{max} = \max(S)$; and $\alpha$, $\beta$ and $\gamma$ are constants, with $\alpha+\beta+\gamma>0$.

In still another aspect of the invention, $\alpha+\beta+\gamma=1$

In yet another aspect of the invention, determining the near-end enhancement spectrum as a function of the weighted spectrum comprises determining the detector spectrum in accordance with:

$$C = \frac{\sum_i \int_{Speech_{min(i)}}^{Speech_{max(i)}} W(f)df}{\int_0^{Spectrum_{total\,max}} W(f)df}$$

where:

$Speech_{min(i)}$ is an ith frequency where N goes above a predetermined threshold;

$Speech_{max(i)}$ is the ith frequency where N drops below the predetermined threshold; and $Spectrum_{total\,max}$ is a maximum frequency of interest in the weighted spectrum, W(f).

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with respect to the figures, in which like parts are identified with the same reference characters.

In accordance with one aspect of the invention, a signal in which near-end speech components are enhanced relative to echo signal components is generated by utilizing information about those frequencies in which the echo canceler is working well to determine a frequency bandwidth in which signal energy is most-likely attributable to near-end voice activity. By calculating the power of primarily those selected frequencies in which echo cancellation is known to be effective, rather than on a larger frequency range that is only generally associated with voice activity, a larger difference between echo components and near-end speech is achieved. Increasing this difference enhances the performances of downstream components that are designed to process near-end speech, such as a voice activity detector, speech recognizer or feedback path for controlling the echo cancellation operation itself.

Figure 2:
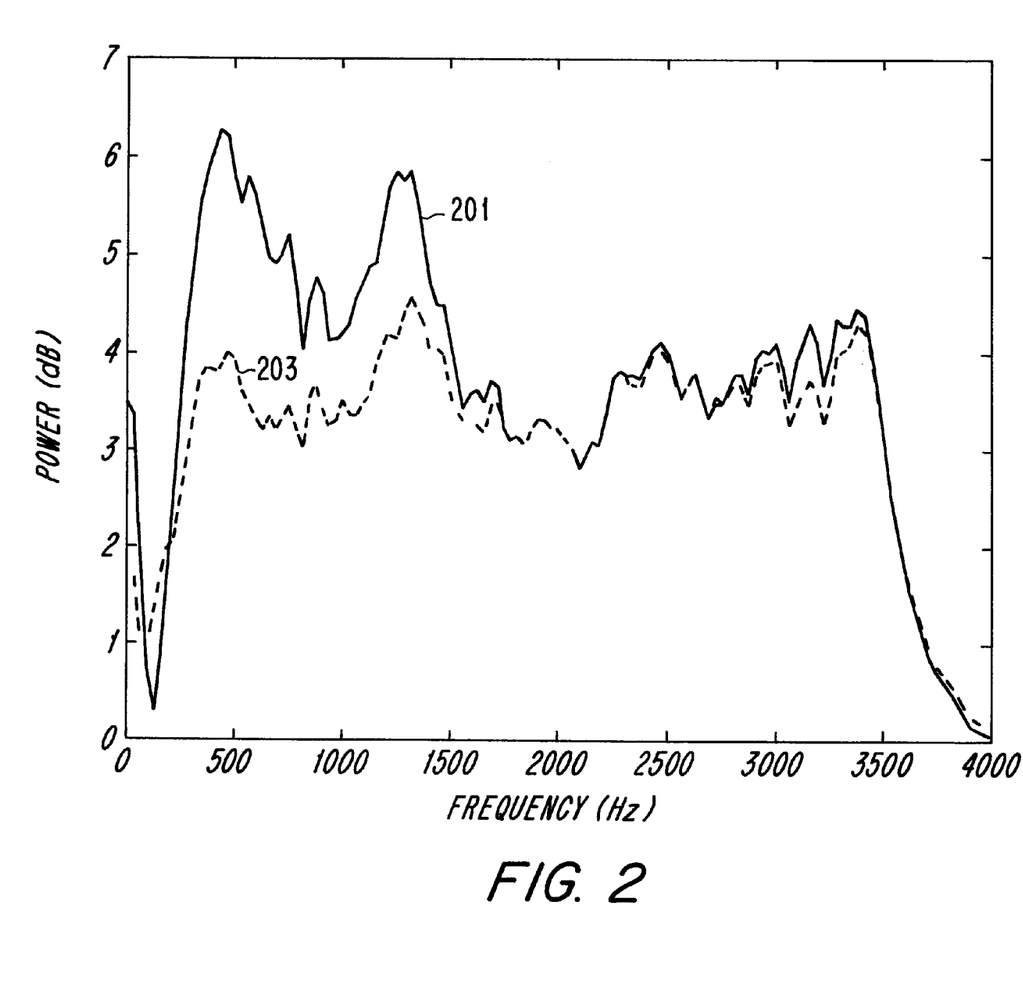
FIG. 2 is a graph comparing the power spectra of a speech signal (one sentence) before and after the application of echo cancellation.

The technique for selecting which frequencies to enhance is dependent on what kind of echo canceler is being used. For example, in an LMS-type echo cancellation approach, the Echo Return Loss Enhancement (ERLE) for each frequency is dependent on the spectral power of the signal. In FIG. 2 the solid line 201 illustrates the power spectrum of a speech signal (one sentence) before the application of echo cancellation. For comparison, the dashed line 203 illustrates the power spectrum of the same speech signal after the application echo cancellation. A substantial loss in echo canceling performance is observable for those frequencies that are lower than 250 Hz or greater than 1500 Hz. Thus, a near-end voice processing unit (e.g., a voice activity detector or speech recognizer) that limited its analysis to only those speech signal frequencies in the range 250 Hz to 1500 Hz would be less likely to mistake an echo component for near-end speech. In general, the particular frequency band that a near-end voice processing unit should operate on for improved performance will depend on signal spectral power as well as the type of echo canceler being used.

The following are considerations that one should take into account when choosing the frequency band or bands to enhance or focus in on when it is desired to process near-end speech to the exclusion of a far-end echo signal. It must be recognized that the true spectrum of the near-end voice signal is unknown because the microphone mixes this with the far-end echo signal. Conventional techniques for detecting speech in a noisy environment often include excluding (e.g., by means of filtering) those frequencies where the noise is dominant. In the far-end echo situation, however, the frequencies associated with the far-end echo signal are, themselves, those associated with speech. That is, we are trying detect near-end speech in the presence of other (e.g., far-end) speech. Thus, simply excluding frequencies associated with the echo is likely to also exclude parts of the signal associated with the near-end speech, thereby defeating the purpose.

Figure 3:
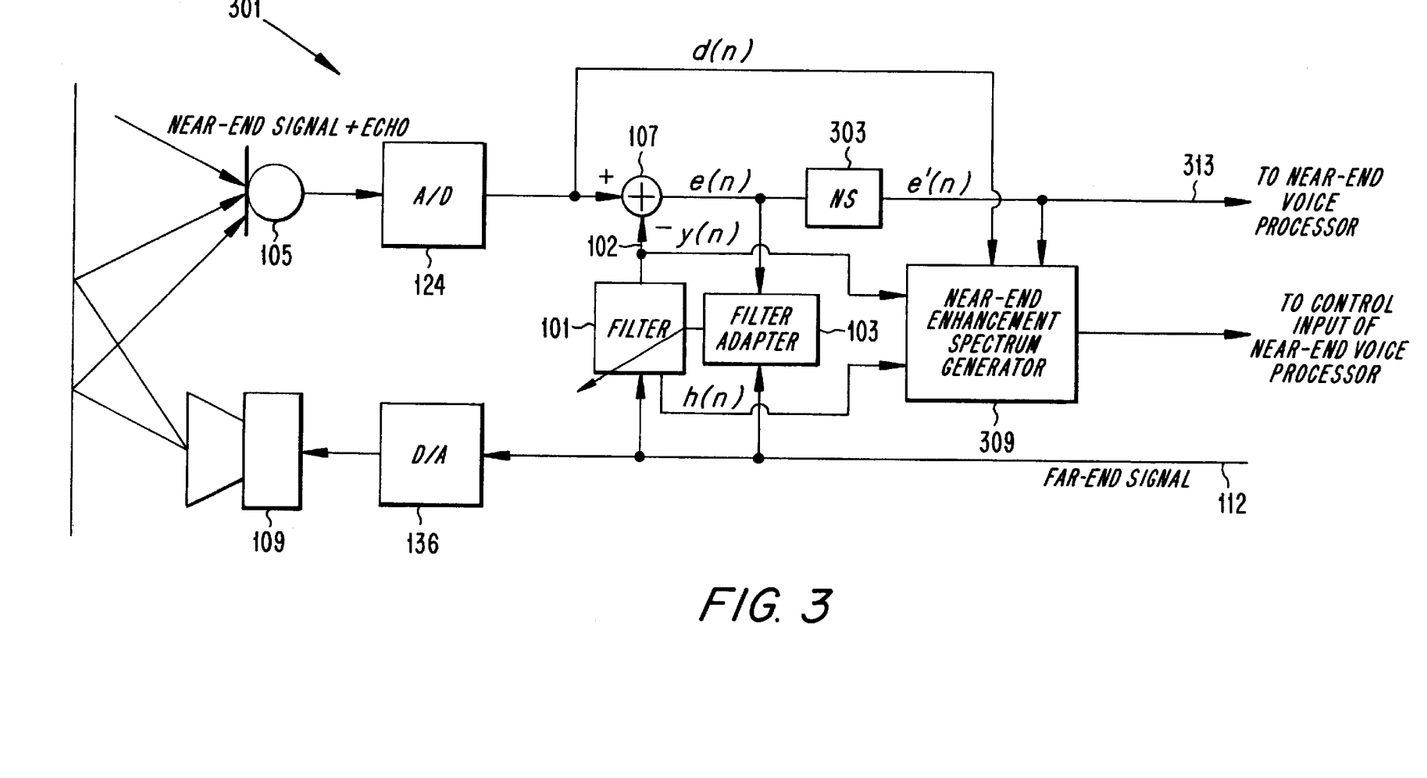
FIG. 3 is a block diagram of an exemplary embodiment of the invention.

As mentioned above, a clean copy of the near-end speech signal is not available, so it is not possible to obtain a measure of the near-end speech spectrum. (In fact, if a clean copy of the near-end speech signal were available, the problem now being addressed would be non-existent). However, a far-end speech signal 112 free of contamination by the near-end speech is available, and this can advantageously be used. First, on average, the spectral energy contained in the echo signal will correspond to the spectral energy of the near-end speech signal (because both are speech signals). Thus, to some extent, the far-end speech signal (or a signal derived from this signal) can be used as a source of information for focusing the search for near-end speech.

We can also obtain a measure of those frequencies in which the echo cancellation is most effective. It is at these frequencies that the near-end speech signal is least likely to be obscured by the presence of echo speech components, so this information can also be sued advantageously in enhancing the near-end speech processing.

The number of frequency bands to be used in the calculation of an enhanced spectrum for near-end speech is up to the designer. The maximum number of frequency bands that can exist in a calculated frequency spectrum is one-half the number of signal samples from which the spectrum is calculated. However, one need not always calculate the maximum number of frequency bands. By determining fewer frequency bands from the same number of signal samples, one may produce a more meaningful number. For example, suppose that a frequency spectrum is to be generated from 1600 samples of a signal being propagated in a GSM cellular communications system. In GSM, these 1600 samples represent 200 msec of speech. Thus, the highest representable frequency is 4000 Hz (the Nyquist frequency). These 1600 samples can be divided up into ten groups, each having 160 samples. Performing a 256-point Fast Fourier Transform (FFT) on each of the ten groups will generate ten spectra, which can be combined using an appropriate weighted averaging strategy. For example, a type of exponential averaging whereby the frequency bands associated with a newly generated frequency spectrum has a much lower weight than a previously determined average (so that the average is slow to respond to changes in the spectrum over time) can be used. This combining of spectra results in a spectrum in which each point (frequency band) is generated from ten times as much information as if a single FFT had been performed on the original 1600 samples to generate more frequency bands. By using a weighted combination technique, a single spectrum generated from a non-representative set of samples will not have a substantial effect on overall operation.

In one embodiment of the invention, a designer might first precalculate one or more frequency bands in which the echo canceler is expected to work well, and then arrange for the subsequent near-end voice processing to only operate in these frequency bands.

In an alternative embodiment, the frequency band or bands upon which the subsequent near-end voice processing is to operate may be determined dynamically. This provides the ability of being able to adapt the near-end voice processing to changing conditions in correspondence to the dynamically changing conditions, such as changes in performance of the echo canceler, and changes in the spectral quality of the far-end signal 112. An exemplary embodiment of near-end speech enhancement in accordance with this aspect of the invention will now be described with reference to the block diagram of FIG. 3.

An exemplary acoustic echo canceling arrangement 301 includes an adaptive filter 101, a filter adaptation unit 103, a loudspeaker 109, a microphone 105, a D/A converter 136, an A/D converter 124, and a subtractor 107 that operate the same as those depicted in FIG. 1. Accordingly, the description of these components is not repeated here. Also shown in the exemplary transceiver is a noise suppression unit 303, although this component is optional. When present, the noise suppression unit 303 could, itself, by dynamically adjusted based on information generated in accordance with the invention (e.g., operation of the noise suppression unit 303 could be a function of whether near-end voice activity is detected in the signal e(n) that is generated at the output of the subtractor 107). The far-end signal 112 may be generated by any number of sources, depending on the particular application. For example, in a cellular telephone the far-end signal 112 could be supplied at the output of a speech decoder (not shown) that generates the far-end signal 112 from a received signal. As an output of the acoustic echo canceling arrangement 301, a processed near-end voice signal 313 is generated, which may be supplied to the input of a near-end voice processor (not shown). The function of the near-end voice processor is application-specific, and is not described herein in detail. In the cellular telephone example, the near-end voice processor may be a voice activity detector (not shown), as well as a speech encoder (not shown) that generates an encoded signal for transmission to the far-end user.

In accordance with the invention, the acoustic echo canceling arrangement 301 further includes a near-end enhancement spectrum generator 309. The output of the near-end enhancement spectrum generator 309 may be supplied to a control input of near-end voice processor for the purpose of enhancing its performance. For example, where the near-end voice processor is a voice activity detector, the voice activity detector can make a voice activity decision based on the characteristics of the particular spectral bands of the processed near-end voice signal 313 as indicated by the near-end enhancement spectrum generator 309 That is, the output of the near-end enhancement spectrum generator 309 determines what type of filtering will be applied to the processed near-end voice signal 313 as part of the voice activity detection strategy.

Similar control adjustments can be made to other types of near-end voice processing equipment, such as speech recognition equipment.

The near-end enhancement spectrum generator 309 may be embodied in a number of forms, and each is considered to be within the scope of the invention. Such forms include computer program instructions embodied as signals on a computer usable storage medium such as random access memory (RAM), magnetic storage media (e.g., magnetic disk, diskette or tape) and optical storage media (e.g., compact disk read only memory (CD ROM)). Alternatively, the invention may be constituted as a programmable processor executing such instructions. The near-end enhancement spectrum generator 309 may alternatively be embodied in any number of arrangements of hard-wired components or programmed logic arrays.

In order to describe the operation of the near-end enhancement spectrum generator 309, the following terms will be defined:

Estimated echo spectrum ($\Gamma$) is the spectrum of the estimated echo signal, y(n) supplied by the adaptive filter 101 (i.e., the signal to be subtracted from the digitized microphone signal d(n)). The estimated echo spectrum $\Gamma$, may be generated from the digitized microphone signal d(n) by means of, for example, an FFT, and is therefore a function of frequency, f. The estimated echo spectrum $\Gamma$ should typically represent the local stationary spectrum of the echo of the far-end spectrum. In an application such as a GSM cellular telephone, this should be the spectrum of 20 msec of speech. Recognizing that the speech in this case does not change its spectral contents faster than 20 msec, the number of samples used for calculating the estimated echo spectrum $\Gamma$ is preferably the same as the number of samples used by the near-end voice processor (e.g., a near-end voice activity detector). If combining techniques (e.g., weighted averaging) are applied to several measures of the estimated echo spectrum $\Gamma$, the weighting should be such that a newly computed estimated echo spectrum $\Gamma$ should quickly affect the combination. In some preferred embodiments, no averaging is applied with respect to the estimated echo spectrum $\Gamma$. It is noted that the estimated echo spectrum, $\Gamma$, can be used to indicate those frequencies that are associated with relative high echo return loss.

Echo Return Loss Enhancement (ERLE) spectrum (E) is the spectrum representing the echo canceling performance of the echo canceling filter. The ERLE spectrum, E, is a function of frequency, f. Several alternative measures of the ERLE spectrum E may be utilized. In some embodiments, the ERLE spectrum may be determined in accordance with:

$$E = \mathcal{F}\{d(n)\} - \mathcal{F}e^1(n)\} \quad (4)$$

where $\mathcal{F}$ represents the Fourier transform, d(n) is the digitized microphone signal containing near-end voice as well as echo and noise components, and e'(n) is the processed near-end voice signal 313.

In alternative embodiments, a different ERLE spectrum may be determined by first generating a time-domain measurement in accordance with:

$$ERLE(n) = 10\log_{10}\left\{\frac{d(n)^2}{e'(n)^2}\right\}. \quad (5.1)$$

From this, the frequency-domain spectrum may be generated in accordance with:

$$E = \{ERLE(n)\} \quad (5.2)$$

Either measure of ERLE spectrum, E, may be used to indicate those frequencies that are associated with relatively high echo return loss. Also, in any of these embodiments, the ERLE spectrum E may be separately determined for each of a group of samples and the resulting spectra combined (e.g., by means of weighted averaging) as described above. The averaging speed (i.e., the speed at which at newly calculated spectrum significantly affects the average) is preferably about the same as the adaptation speed of the adaptive filter 101 so that the ERLE spectrum E will accurately reflect the echo cancellation performance.

Near-end spectrum (N) is the spectrum of the received signal after echo canceling and optional Noise suppression (i.e., it is the spectrum of the processed near-end speech signal 313). The near-end spectrum, N, is a function of frequency, f, and may be calculated as the FFT of the processed near-end voice signal 313 (e'(n)). It is preferably calculated using the same number of samples as are used for calculating the estimated echo spectrum, $\Gamma$.

Echo spread spectrum (S) represents the spectral spreading properties of the echo path. That is, it is a measure of an estimate of how different frequencies will be transferred between the loudspeaker 109 and the microphone 105. The echo spread spectrum, S, is a function of frequency, f, and may be calculated as the Fourier transform of the coefficients, h(n), that determine the nature of the filtering performed by the adaptive filter 101. That is, S=$\mathcal{F}$\{h(n)\}.

Figure 4:
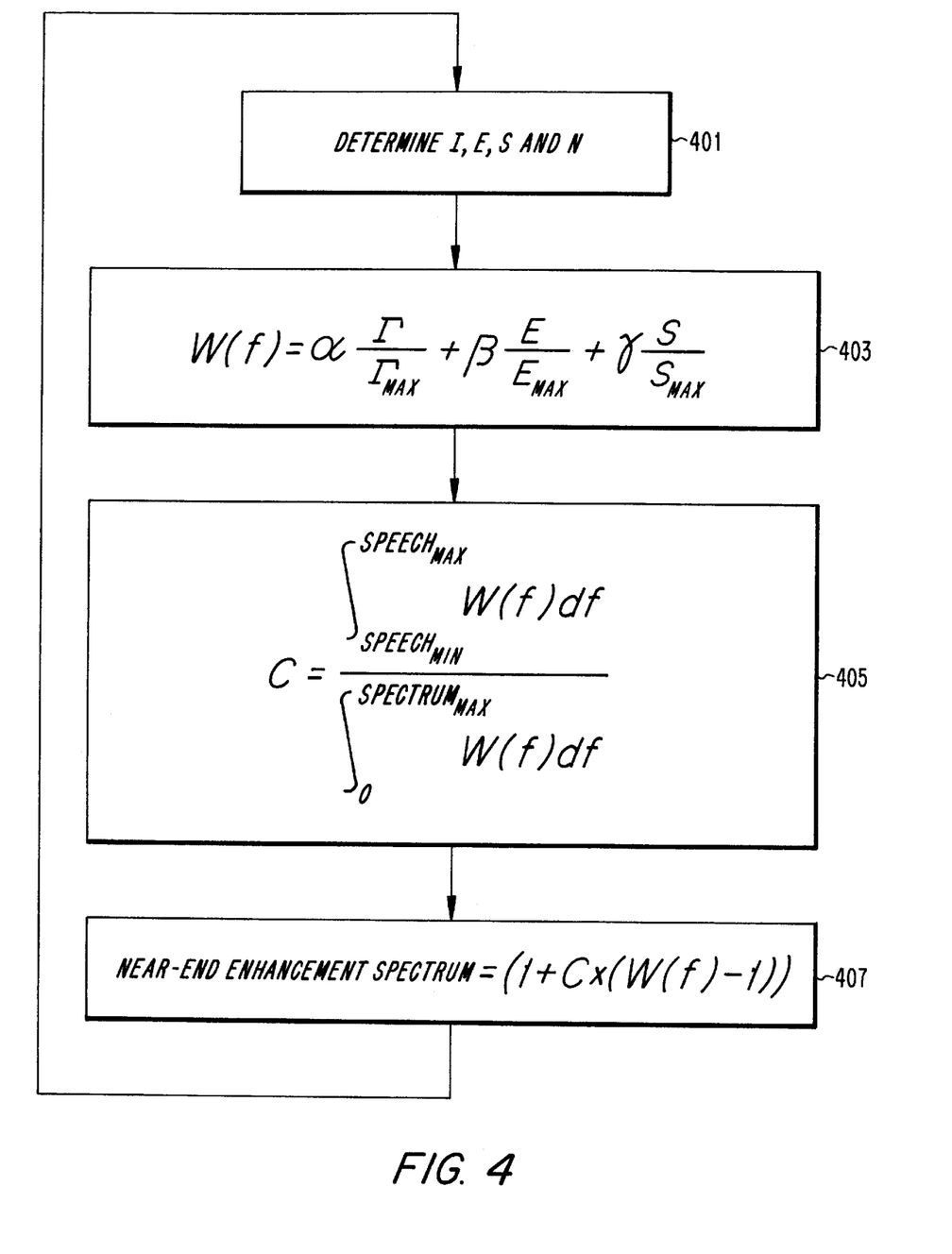
FIG. 4 is a flow chart depicting steps performed in accordance with the invention.

As in the earlier-described embodiment, the use of the ERLE spectrum (E) to determine the frequency band in which the near-end voice processing should operate (henceforth referred to as "detector spectrum") improves near-end detection performance. In accordance with another aspect of the invention, the benefits derived from the use of the E spectrum can be achieved without losing performance when the estimated echo spectrum ($\Gamma$) does not correspond to E by determining the detector spectrum as follows:

Referring to the flow chart of FIG. 4, the various spectra, $\Gamma$, E, S and N are first determined as described above (step 401).

Next, at step 403, a weighted spectrum, W(f), is determined from the estimated echo spectrum, $\Gamma$, the ERLE spectrum, E, and the echo spread spectrum, S in accordance with:

$$W(f) = \alpha \frac{\Gamma}{\Gamma_{max}} + \beta \frac{E}{E_{max}} + \gamma \frac{S}{S_{max}} \quad (6)$$

where:
$\Gamma_{max}$=max($\Gamma$), $E_{max}$=max(E) and $S_{max}$=max(S); and $\alpha$, $\beta$ and $\gamma$ are constants.

It will be readily apparent that the purpose of dividing each of the $\Gamma$, E and S spectra by their respective maximum values is to generate normalized spectra that can then be combined, after scaling with the corresponding one of the weighting factors $\alpha$, $\beta$ and $\gamma$.

In preferred embodiments, the sum $\alpha+\beta+\gamma$ is close to the value one (e.g., it might range from a fractional value close to but not equal to zero up to a value of approximately two), but this is not a strict requirement.

Figure 5:
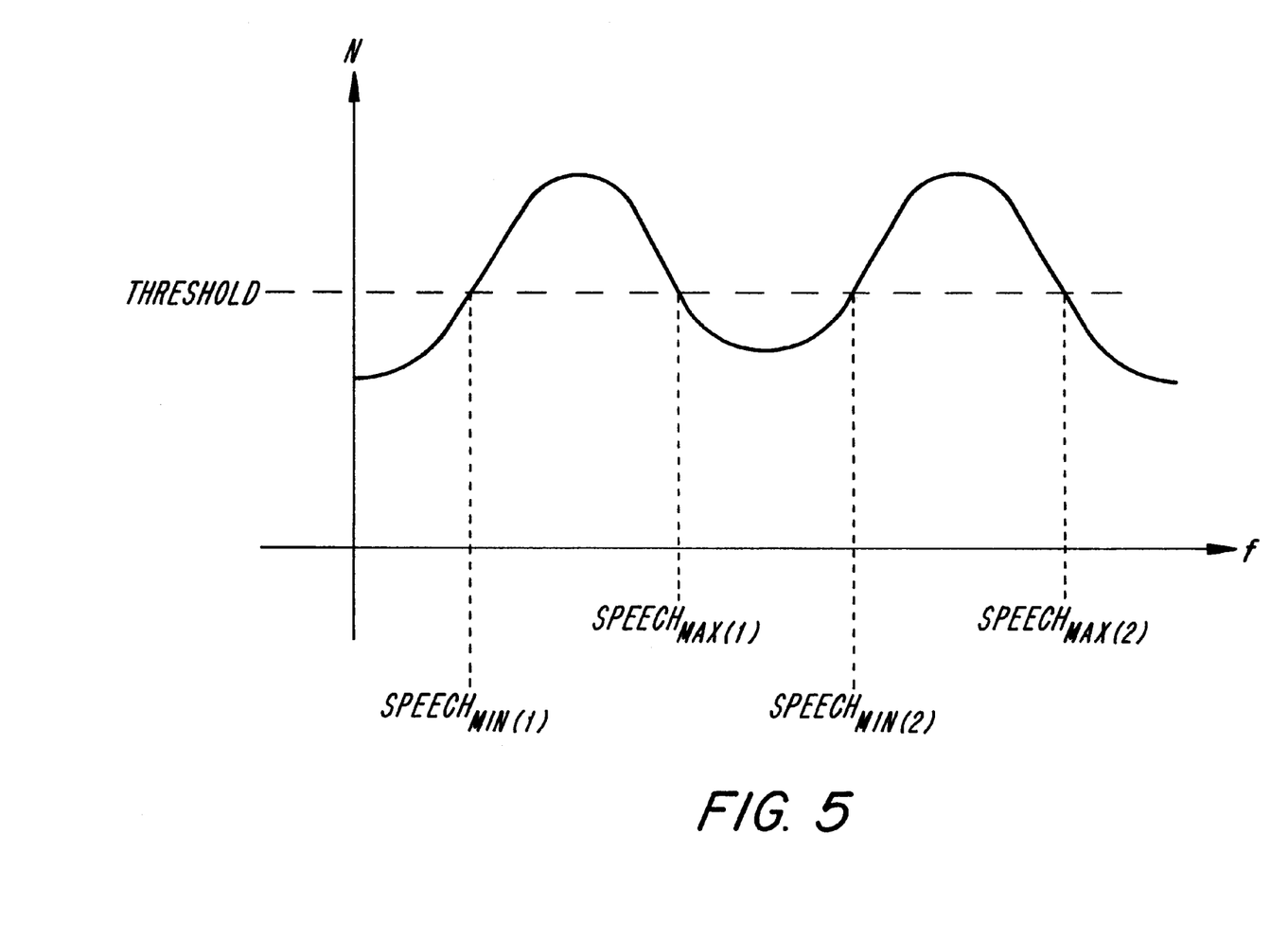
FIG. 5 is an exemplary near-end spectrum, N, illustrating the case of several noncontiguous frequency bands over which the magnitude exceeds a predetermined threshold level.

Next, at step 405, a compression factor, C, is determined, which represents the extend to which the weighted spectrum, W(f), includes power that lies within the one or more frequency bands in which the near-end spectrum, N, has its greatest energy components. Reference is made to one or more frequency bands because the near-end spectrum, N, may have several noncontiguous frequency bands over which the magnitude exceeds a predetermined threshold level, as illustrated by the first band between $SPEECH_{MIN(1)}$ and $SPEECH_{MAX(1)}$ and the second band between $SPEECH_{MIN(2)}$ and $SPEECH_{MAX(2)}$ in FIG. 5. The compression factor, C, is given by:

$$C = \frac{\sum_i \int_{Speech_{min(i)}}^{Speech_{max(i)}} W(f)df}{\int_0^{Spectrum_{total\ max}} W(f)df} \qquad (7)$$

where:

$Speech_{min(i)}$ is the ith frequency where N goes above a predetermined threshold that is application specific, and is therefore set by a designer;

$Speech_{max(i)}$ is the ith frequency where N drops below the predetermined threshold; and $Speech_{total\ max}$ is a maximum frequency in the weighted spectrum, W(f), that we are interested in. That is, the value of the function W(f) may be assumed to be equal to zero for all frequencies higher than $Spectrum_{total\ max}$.

It is further noted that, although the compression factor, C, is defined as the ratio of two integrals, in practice it may often be easily computed by approximating the corresponding spectra as being essentially flat over various ranges of frequencies. This will be further illustrated in several examples presented below.

Having determined the compression factor, C, and the weighted spectrum, W(f), the detector spectrum is then obtained at step 407 by computing the following:

Near-end Enhancement Spectrum=$(1+C\times(W(f)-1))$ (8)

It will be recognized that the resultant Near-end Enhancement Spectrum is a function of frequency, f.

The Near-end Enhancement Spectrum may then be supplied to a control input of a near-end voice processor (not shown). For example, the Near-end Enhancement Spectrum may be used to determine the bandpass filtering performed by a near-end voice activity detector in a cellular telephone.

For dynamically adjustable operation, the steps are periodically repeated, beginning again at step 401, as indicated in FIG. 4. For example, in a system in which a frame of 160 samples is generated once every 20 msec, a new Near-end Enhancement Spectrum may also be determined once every 20 msec.

Several examples will now be presented to illustrate the above-described techniques. In each case, all illustrated spectra have been normalized, except for the near-end spectrum, N. (The reason for not normalizing N is to retain information about the actual energy levels of the processed near-end voice signal 313.) Furthermore, in the following examples the spread spectra are considered to be uniformly distributed, which is often the case. To further facilitate an understanding of the invention, N is shown having only one region where the magnitude exceeds a predetermined threshold level. This avoids having to sum separately computed integrals.

Figure 6A:
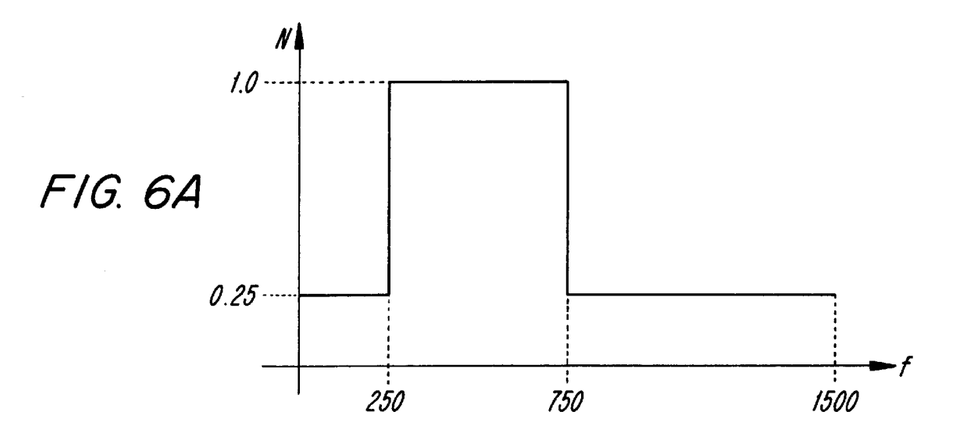
FIG. 6A is a graph of an exemplary normalized near-end speech spectrum, N.

The first example will now be described with reference to FIGS. 6A through 6E. FIG. 6A is a graph of a near-end speech spectrum, N. In the interval from f=0 to f=250 Hz, N=0.25; in the interval from f=250 Hz to 750 Hz, N=1.0; and in the interval from f=750 Hz to f=1500 Hz, N=0.25.

(Note:the depiction of a maximum value of 1.0 is done merely for illustrative purposes; in general, N is not normalized).

Figure 6B:
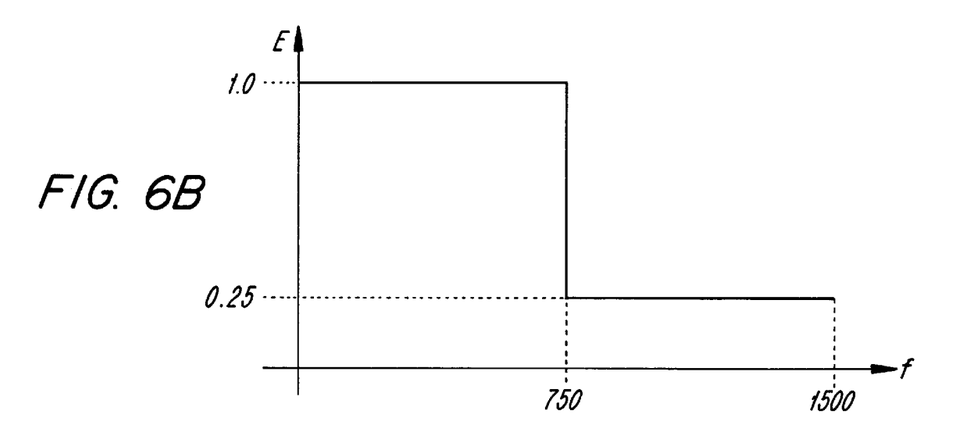
FIG. 6B is a graph of an exemplary normalized ERLE spectrum, E.

Continuing with the example, FIG. 6B is a graph of a normalized ERLE spectrum, E. In the interval from f=0 to f=750 Hz, E=1.0; and in the interval from f=750 Hz to f=1500 Hz E=0.25.

Figure 6C:
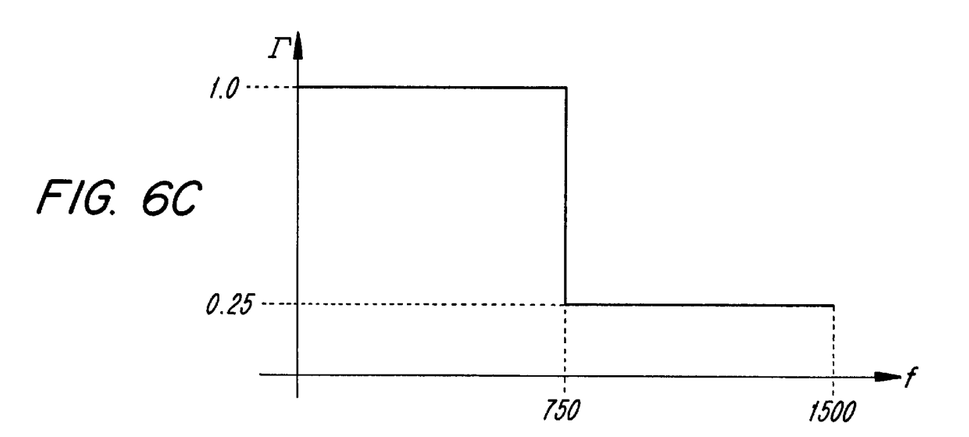
FIG. 6C is a graph of an exemplary normalized loudspeaker spectrum, $\Gamma$.

A graph of a normalized estimated echo spectrum, Γ, is depicted in FIG. 6C. In the interval from f=0 to f=750 Hz, Γ=1.0; and in the interval from f=750 Hz to f=1500 Hz, Γ=0.25.

Figure 6D:
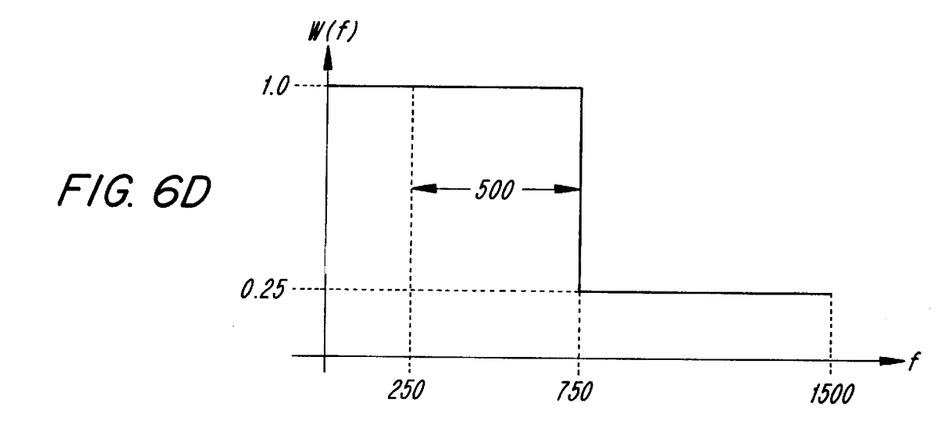
FIG. 6D is a graph of an exemplary weighted spectrum, in accordance with one aspect of the invention.

In this example, the weighted spectrum is given by:

$W(f)=\frac{1}{2}\Gamma+\frac{1}{2}E+0$.

(Because, in this example, the weighting coefficient γ=0, it is irrelevant what the echo spread spectrum, S, looks like.) Given the normalized estimated echo spectrum, Γ (as depicted in FIG. 6C) and the normalized ERLE spectrum, E (as depicted in FIG. 6B), the resultant weighted spectrum, W(f), for this example, is depicted in FIG. 6D.

Next, we compute the Compression factor, C. If we assume that the predetermined threshold is 0.25, then we can see from FIG. 6A that there is only one band of frequencies that exceed this threshold, and that these are bounded by:

$Speech_{min}$=250 Hz;

$Speech_{max}$=750 Hz; and $Speech_{total\ max}$=1500 Hz.

Therefore, in accordance with Eq. (7):

$$C = \frac{\int_{Speech_{min}}^{Speech_{max}} W(f)df}{\int_0^{Spectrum_{total\ max}} W(f)df} = $$

$$\frac{(750-250)\times 1}{(750-0)\times 1 + (1500-750)\times 0.25} = 0.5333...$$

Because the weighted spectrum, W(f), is constant for each of several ranges, the integrals, and hence C, are relatively easy to compute.

Figure 6E:
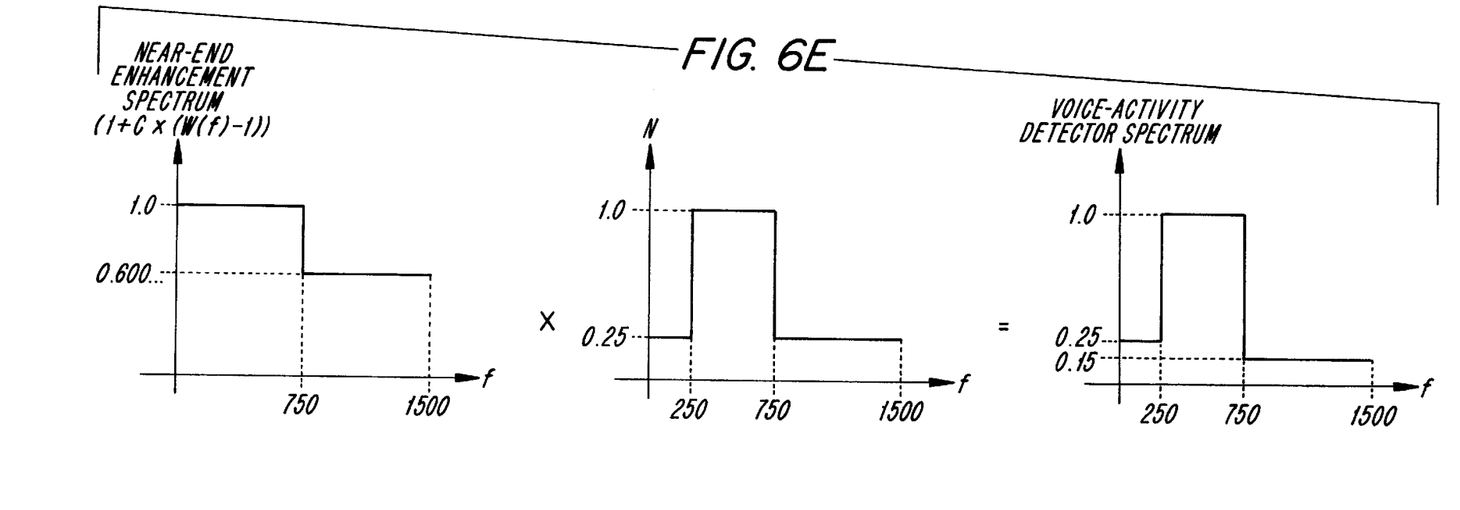
FIG. 6E is a graphical depiction of the determination of an exemplary Compression factor, C, in accordance with one aspect of the invention.

We can now compute the Near-end Enhancement Spectrum in accordance with Eq. (8). The left-most spectrum in FIG. 6E depicts the resulting Near-end Enhancement Spectrum for this example. It can be seen that it has a magnitude of 1.0 in the range f=0 of f=750 Hz; and a value of 0.600 . . . between f=750 Hz and f=1500 Hz.

FIG. 6E further depicts application of this Near-end Enhancement Spectrum to control a near-end voice processor, such as a voice activity detector. Such a voice activity detector would have its bandpass filtering function adjusted to conform to the Near-end Enhancement Spectrum. As a result, when the processed near-end voice signal 313 is applied to the voice activity detector, (see middle spectrum in FIG. 6E), the resulting voice activity detector spectrum looks like the one depicted on the right side of FIG. 6E. We can see that the resultant detector spectrum is equal to 0.25 in the range from f=0 to f=250 Hz; is equal to 1.0 in the range from f=250 Hz to f=750 Hz; and is equal to 0.15 in the range from f=750 Hz to f=1500 Hz. As a result, there would be no change in its operation for those frequencies (i.e., between f=0 Hz and f=750 Hz—see the exemplary weighted spectrum in FIG. 6D) where the echo canceling operation is good. However, those frequencies associated with poor echo canceling performance have a much reduced impact on the performance of the near-end detector. As a result, the performance of the near-end detector will be improved.

Figure 7A:
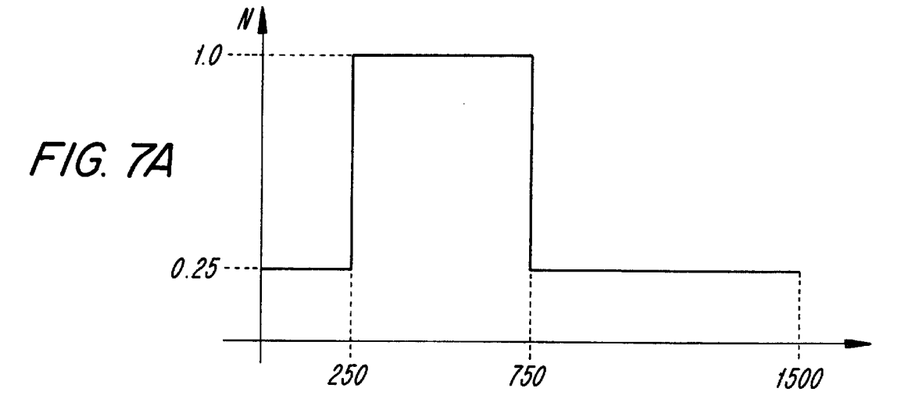
FIG. 7A is a graph of another exemplary normalized near-end speech spectrum, N.

A second example will now be described with reference to FIGS. 7A through 7E. FIG. 7A is a graph of a near-end speech spectrum, N. In the interval from f=0 to f=250 Hz, N=0.25; in the interval from f=250 Hz to 750 Hz, N=1.0; and in the interval from f=750 Hz to f=1500 Hz, N=0.25. (Note:the depiction of a maximum value of 1.0 is done merely for illustrative purposes; in general, N is not normalized.)

Figure 7B:
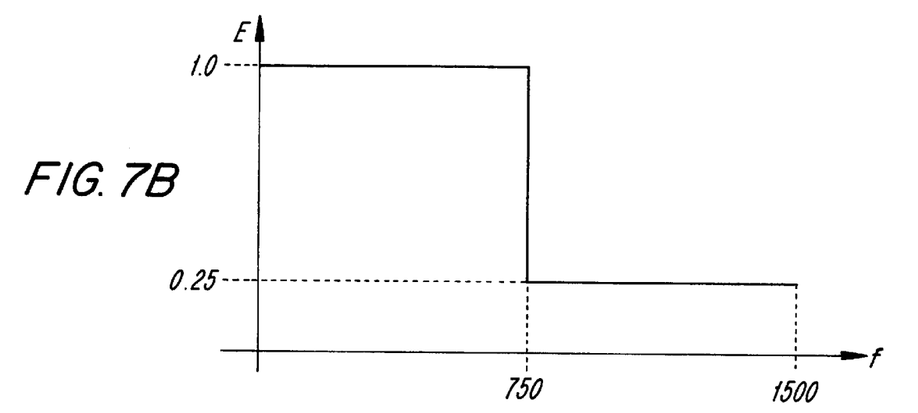
FIG. 7B is a graph of another exemplary normalized ERLE spectrum, E.

Continuing with the example, FIG. 7B is a graph of a normalized ERLE spectrum E. In the interval from f=0 to f=750 Hz, E=1.0; and in the interval from f=750 Hz to f=1500 Hz E=0.25.

Figure 7C:
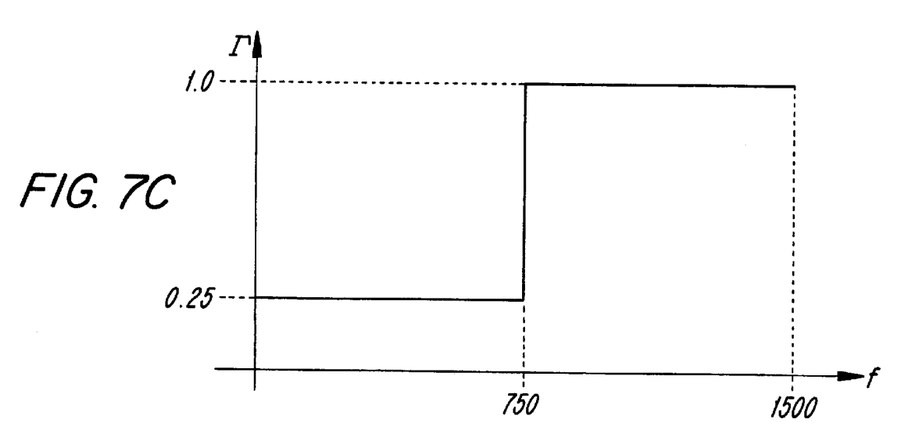
FIG. 7C is a graph of another exemplary normalized loudspeaker spectrum, $\Gamma$.

So far, the example follows that presented above with respect to FIGS. 6A through 6E. However, here a graph of a different normalized estimated echo spectrum, Γ, is depicted in FIG. 7C. In the interval from f=0 to f=750 Hz, Γ=0.25; and in the interval from f=750 Hz to f=1500 Hz, Γ=1.0.

Figures 7D, 7E:
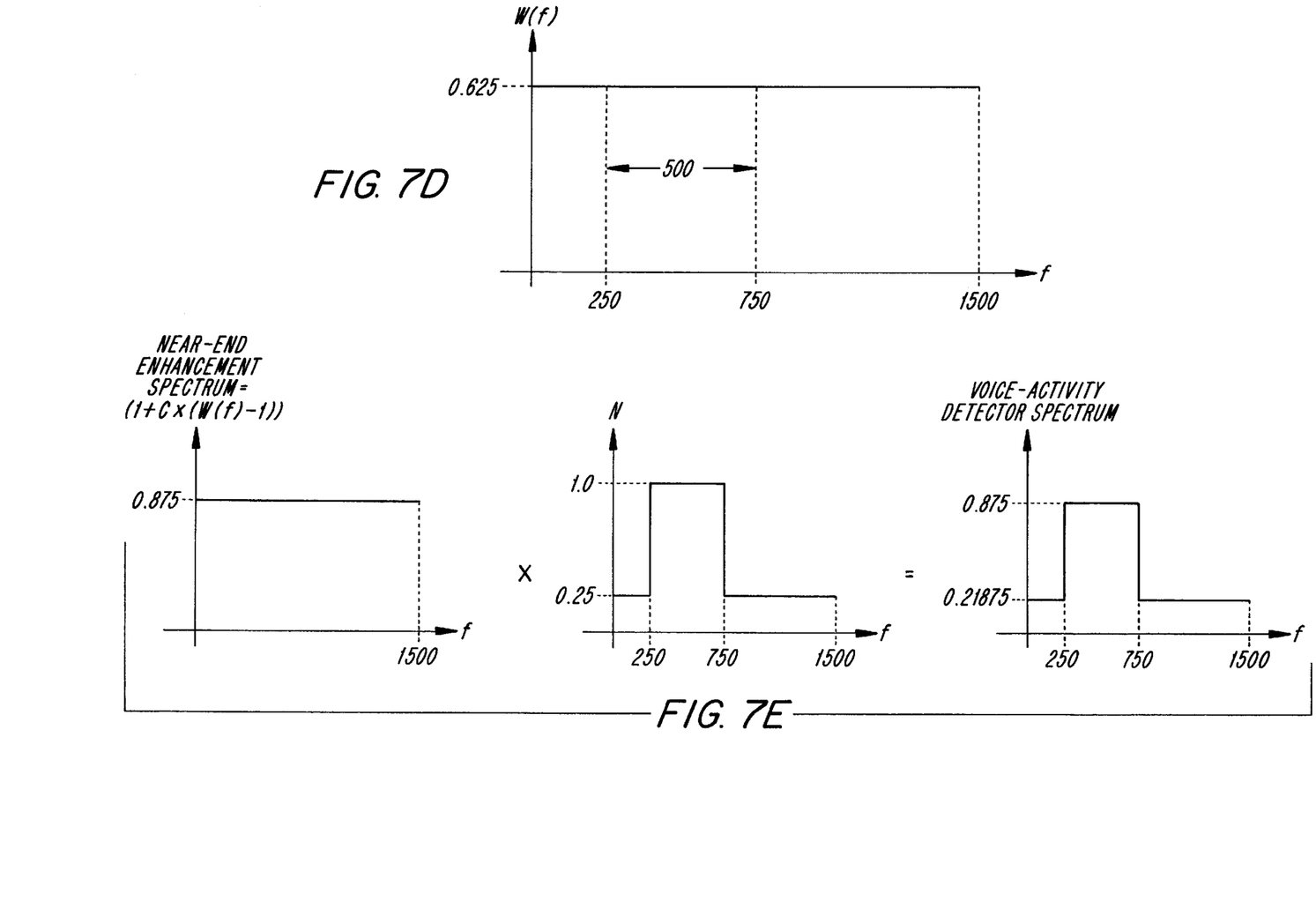
FIG. 7D is a graph of another exemplary weighted spectrum, in accordance with one aspect of the invention.
FIG. 7E is another graphical depiction of the determination of an exemplary Compression factor, C, in accordance with one aspect of the invention.

In this example, we will again assume that the weighted spectrum is given by:

$$W(f) = \tfrac{1}{2}\Gamma + \tfrac{1}{2}E + 0.$$

(Because, in this example, the weighting coefficient γ=0, it is irrelevant what the echo spread spectrum, S, looks like.) Given the normalized estimated echo spectrum, Γ (as depicted in FIG. 7C) and the normalized ERLE spectrum, E (as depicted in FIG. 7B), the resultant weighted spectrum, W(f), for this example, is depicted in FIG. 7D. Notice that it is a constant (=0.625) throughout the entire range from f=0 through f=1500.

Next, we compute the Compression factor, C. From FIG. 7A we can see that
Speech$_{min}$=250 Hz;
Speech$_{max}$=750 Hz; and
Spectrum$_{total\ max}$=1500 Hz.

Therefore, in accordance with Eq. (7):

$$C = \frac{\int_{Speech_{min}}^{Speech_{max}} W(f)\,df}{\int_{0}^{Spectrum_{total\ max}} W(f)\,df} = \frac{(750-250) \times 0.625}{(1500-0) \times 0.625} = \frac{1}{3}$$

Because the weighted spectrum, W(f), is constant for the entire range between f=0 and f=1500 Hz, the integrals, and hence C, are again relatively easy to compute.

We can now compute the Near-end Enhancement Spectrum for this example in accordance with Eq. (8). The left-most spectrum in FIG. 7E depicts the resulting Near-end Enhancement Spectrum for this example. It can be seen that it has a magnitude of 0.875 throughout the entire range from f=0 to f=1500 Hz.

FIG. 7E further depicts application of this Near-end Enhancement Spectrum to control a near-end voice processor, such as a voice activity detector. Such a voice activity detector would have its bandpass filtering function adjusted to conform to the Near-end Enhancement Spectrum. As a result, when the processed near-end voice signal 313 is applied to the voice activity detector, (see middle spectrum in FIG. 7E), the resulting voice activity detector spectrum looks like the one depicted on the right side of FIG. 7E. We can see that the resultant detector spectrum is equal to 0.21875 in the range from f=0 to f=250 Hz; is equal to 0.875 in the range from f=250 Hz to f=750 Hz; and is again equal to 0.21875 in the range from f=750 Hz to f=1500 Hz. It can be seen that for this case, in which there is no or low correlation between the ERLE spectrum, E, and the estimated echo spectrum, Γ, the entire detector spectrum will be attenuated. Nonetheless, the near-end detector will still be most responsive to those frequencies in which the near-end spectrum, N, has its maximum components.

The invention has been described with reference to particular embodiments. However, it will be readily apparent to those skilled in the art that it is possible to embody the invention in specific forms other than those of the preferred embodiments described above. This may be done without departing from the spirit of the invention.

For example, the illustrated spectra have been idealized for the sake of facilitating a discussion of the invention. However, in practice, any or all of these spectra may not match the exemplary step functions depicted in FIGS. 6A–6E and 7A–7E. Rather, some or all of these spectra may described by more complicated mathematical functions. This difference notwithstanding, it is expected that the resulting Detector Spectrum will be characterized by a range of contiguous frequencies over which the Detector Spectrum takes on its largest values, wherein the range of contiguous frequencies are those associated with a relatively high echo return loss in the processed signal.

Thus, the preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of generating an enhanced near-end voice signal, comprising the steps of:
   a) receiving an audio signal;
   b) generating an estimated acoustic echo signal;
   c) generating a processed signal by removing the estimated acoustic echo signal from the audio signal;
   d) determining a near-end enhancement spectrum having a range of contiguous frequencies over which the near-end enhancement spectrum has a magnitude greater than a predetermined threshold, wherein the range of contiguous frequencies are those associated with a relatively high echo return loss in the processed signal; and
   e) filtering the processed signal in accordance with the near-end enhancement spectrum, thereby generating the enhanced near-end voice signal.

2. The method of claim 1, further comprising the steps of:
   f) measuring how much energy is contained in the enhanced near-end voice signal; and
   g) detecting whether near-end voice activity exists based on the measured energy of the enhanced near-end voice signal.

3. The method of claim 1, further comprising the step of:
   f) recognizing near-end speech contained in the enhanced near-end voice signal.

4. The method of claim 1, wherein steps a) through e) are repeated periodically.

5. The method of claim 1, wherein the step of determining the near-end enhancement spectrum comprises determining the near-end enhancement spectrum as a function of a weighted spectrum, wherein the weighted spectrum is defined as:

$$W(f) = \alpha \frac{\Gamma}{\Gamma_{max}} + \beta \frac{E}{E_{max}} + \gamma \frac{S}{S_{max}}$$

where:
- Γ is a spectrum of an estimate of an acoustic echo derived from a far-end signal;
- E is an Echo Return Loss Enhancement spectrum that represents an echo canceling performance of step c);
- S is an echo spread spectrum that represents spectral spreading properties of the echo path;
- $\Gamma_{max}=\max(\Gamma), E_{max}=\max(E)$ and $S_{max}=\max(S)$; and
- α, β and γ are constants, with α+β+γ+>0.

6. The method of claim 5, wherein α+β+γ=1.

7. The method of claim 5, wherein the step of determining the near-end enhancement spectrum as a function of the weighted spectrum comprises determining the near-end enhancement spectrum in accordance with:

$$C = \frac{\sum_i \int_{Speech_{min(i)}}^{Speech_{max(i)}} W(f)df}{\int_0^{Spectrum_{total\ max}} W(f)df}$$

where:
- $Speech_{min(i)}$ is an ith frequency where N goes above a predetermined threshold;
- $Speech_{max(i)}$ is the ith frequency where N drops below the predetermined threshold; and
- $Spectrum_{total\ max}$ is a maximum frequency of interest in the weighted spectrum, W(f).

8. An enhanced near-end voice signal generator, comprising:
   a) means for receiving an audio signal;
   b) means for generating an estimated acoustic echo signal;
   c) means for generating a processed signal by removing the estimated acoustic echo signal from the audio signal;
   d) means for determining a near-end enhancement spectrum having a range of contiguous frequencies over which the near-end enhancement spectrum has a magnitude greater than a predetermined threshold, wherein the range of contiguous frequencies are those associated with a relatively high echo return loss in the processed signal; and
   e) a filter for filtering the processed signal in accordance with the near-end enhancement spectrum, thereby generating an enhanced near-end voice signal.

9. The enhanced near-end voice signal generator of claim 8, further comprising:
   f) means for measuring how much energy is contained in the enhanced near-end voice signal; and
   g) means for detecting whether near-end voice activity exists based on the measured energy of the enhanced near-end voice signal.

10. The enhanced near-end voice signal generator of claim 8, further comprising:
    f) a speech recognizer coupled to receive the enhanced near-end voice signal.

11. The near-end voice activity detector of claim 8, wherein elements a) through e) repeatedly operate periodically.

12. The enhanced near-end voice signal generator of claim 8, wherein the means for determining the near-end enhanced spectrum comprises means for determining the near-end enhanced spectrum as a function of a weighted spectrum, wherein the weighted spectrum is defined as:

$$W(f) = \alpha \frac{\Gamma}{\Gamma_{max}} + \beta \frac{E}{E_{max}} + \gamma \frac{S}{S_{max}}$$

where:
- Γ is a spectrum of an estimate of an acoustic echo derived from a far-end signal;
- E is an Echo Return Loss Enhancement spectrum that represents an echo canceling performance of the means for generating a processed signal;
- S is an echo spread spectrum that represents spectral spreading properties of the echo path;
- $\Gamma_{max}=\max(\Gamma), E_{max}=\max(E)$ and $S_{max}=\max(S)$; and
- α, β and γ are constants, with α+β+γ>0.

13. The enhanced near-end voice signal generator of claim 12, wherein α+β+γ=1.

14. The enhanced near-end voice signal generator of claim 12, wherein the means for determining the near-end enhanced spectrum as a function of the weighted spectrum comprises means for determining the near-end enhanced spectrum in accordance with:

$$C = \frac{\sum_i \int_{Speech_{min(i)}}^{Speech_{max(i)}} W(f)df}{\int_0^{Spectrum_{total\ max}} W(f)df}$$

where:
- $Speech_{min(i)}$ is an ith frequency where N goes above a predetermined threshold;
- $Speech_{max(i)}$ is the ith frequency where N drops below the predetermined threshold; and
- $Spectrum_{total\ max}$ is a maximum frequency of interest in the weighted spectrum, W(f).

* * * * *